US010273439B2

(12) United States Patent
Peterson et al.

(10) Patent No.: US 10,273,439 B2
(45) Date of Patent: Apr. 30, 2019

(54) ALCOHOLIC BEVERAGE CONCENTRATE PROCESS

(71) Applicant: Bedford Systems LLC, New York, NY (US)

(72) Inventors: Peter Rae Peterson, Williston, VT (US); Thomas J. Novak, Morristown, VT (US)

(73) Assignee: BEDFORD SYSTEMS LLC, Bedford, MA (US)

( * ) Notice: Subject to any disclaimer, the term of this patent is extended or adjusted under 35 U.S.C. 154(b) by 302 days.

(21) Appl. No.: 15/040,275

(22) Filed: Feb. 10, 2016

(65) Prior Publication Data

US 2016/0230133 A1 Aug. 11, 2016

Related U.S. Application Data

(60) Provisional application No. 62/114,696, filed on Feb. 11, 2015.

(51) Int. Cl.
| | | |
|---|---|---|
| C12H 1/07 | (2006.01) | |
| C12H 1/16 | (2006.01) | |
| C12G 3/14 | (2006.01) | |
| C12G 3/08 | (2006.01) | |
| C12C 11/11 | (2019.01) | |
| C12G 3/12 | (2006.01) | |

(52) U.S. Cl.
CPC .............. *C12H 1/063* (2013.01); *C12C 11/11* (2013.01); *C12G 3/085* (2013.01); *C12G 3/105* (2013.01); *C12G 3/12* (2013.01); *C12H 1/16* (2013.01)

(58) Field of Classification Search
CPC ....................................................... C12G 3/085
USPC .................................................. 426/590, 592
See application file for complete search history.

(56) References Cited

U.S. PATENT DOCUMENTS

| | | |
|---|---|---|
| 4,265,920 A | 5/1981 | Thijssen |
| 4,792,402 A | 12/1988 | Fricker |
| 5,281,430 A | 1/1994 | Herron et al. |
| 2012/0251665 A1 | 10/2012 | Larsen |
| 2014/0212542 A1 | 7/2014 | Minhas |

FOREIGN PATENT DOCUMENTS

| | | |
|---|---|---|
| EP | 0 180 442 A2 | 5/1986 |
| EP | 1 571 200 A1 | 9/2005 |
| WO | WO 2006/108232 A1 | 10/2006 |

OTHER PUBLICATIONS

International Search Report and Written Opinion for PCT/US2016/017234, dated May 23, 2016 (11 pages).

*Primary Examiner* — Vera Stulii
(74) *Attorney, Agent, or Firm* — Dorsey & Whitney LLP (57) ABSTRACT

Methods and systems for forming a concentrate from an alcoholic beverage, such as a beverage made by fermentation processes. A membrane process may be used to reduce water and alcohol content, followed by freeze concentration to further reduce water content.

33 Claims, 7 Drawing Sheets

ALCOHOLIC BEVERAGE CONCENTRATE PROCESS

CROSS REFERENCE TO RELATED APPLICATION

This application claims the benefit of U.S. Provisional Application No. 62/114,696, filed Feb. 11, 2015, which is hereby incorporated by reference in its entirety.

BACKGROUND

The inventions described herein relate to producing a beverage concentrate from an alcoholic beverage, e.g., to producing a beverage concentrate from a primarily fermentation-derived alcoholic beverage.

SUMMARY OF INVENTION

Aspects of the invention provide for the formation of a concentrate from an alcoholic beverage, such as wine or beer. The inventors have found that in some cases, a high alcohol content in a beverage concentrate may cause an increase in turbidity or even the precipitation of proteins and/or other materials from the concentrate. Such increased turbidity can be undesireable when using the concentrate to form a beverage that is intended to be transparent or "clear," such as a pilsner beer, because the resulting beverage can appear cloudy and is less desired by consumers. Some embodiments avoid the increased turbidity problem by lowering the alcohol concentration of the concentrate initially, and then removing water to increase the solids concentration of the concentrate. The removed alcohol may be reintroduced, at least in part, into the concentrate and/or into a beverage made using the concentrate at a later time, such as when the beverage is formed at the time of consumption.

In one aspect of the invention, a method for forming a concentrate from an alcoholic beverage includes providing an alcoholic beverage including a solids concentration of 20% or less, and alcohol concentration of 30% or less, and water. The alcoholic beverage may be made using a fermentation process, such as is used in making wine or beer, or the beverage may be made synthetically by combining desired compounds together. As an example, the alcoholic beverage may include beer, cider, mead, malt liquor, lager, and ale, and may be made using a high gravity brewing process. The dissolved solids or solubles included in the beverage may take any suitable form, such as proteins, sugars, etc. The alcoholic beverage may be subjected to a membrane process by which at least some water and alcohol pass through a membrane to be part of a permeate and other components of the alcoholic beverage do not pass through the membrane and are part of a retentate. The membrane process may be, or include, a reverse osmosis process, a forward osmosis process, a diafiltration process, an ultrafiltration process, etc., and may function to remove substantial amounts of alcohol from the alcoholic beverage and/or retentate. That is, the beverage may be subjected to a membrane process to remove alcohol and water, and to form a first retentate, which is itself subjected to a membrane process to form a second retentate, and so on. The membrane processes may be the same, or different, e.g., forward osmosis followed by reverse osmosis, etc., and any suitable number of membrane processes may be employed.

Water in the retentate may be frozen to form ice, and the ice may be removed from the retentate to reduce water content and form a beverage concentrate having a solids concentration of at least 30% and an alcohol concentration of 20% or less. The process of freezing water in the retentate and removing resulting ice may be performed in different ways, such as by passing the retentate through a chilled reservoir or conduit so that ice forms on the reservoir/conduit walls. The ice may be removed, e.g., by scraping ice from the walls and filtering or otherwise removing ice so as to increase the solids concentration of the concentrate. In some cases, the freezing process may perform a lagering action on non-lagered materials, such as a beer that has not been lagered. In some embodiments, the beverage concentrate may have a solids concentration of at least 40%, e.g., 50%, and may have an alcohol concentration of 2% or less, e.g., below 1%. As a result, any turbidity or precipitation problems that may be caused by a relatively high alcohol concentration in the concentrate may be avoided. Moreover, the concentrate may be used to form a low alcohol beverage. For example, a ratio of a volume of alcoholic beverage used to form a volume of beverage concentrate to the volume of the beverage concentrate may be at least 3 to 1, at least 5 to 1, or more. Thus, when the concentrate is used to form a beverage, a relatively large amount of water may be mixed with the concentrate. Provided the alcohol content of the concentrate is suitably low, the beverage formation process may result in a very low alcohol content of the finished beverage.

In some embodiments, a ratio of the solids concentration in the alcoholic beverage to the solids concentration in the beverage concentrate may be at least 5 to 1, at least 15 to 1, or more. Thus, the process may enable the formation of a highly concentrated material, while avoiding turbidity and other problems.

In one embodiment, the alcoholic beverage may be subjected to a membrane process by which at least some water and alcohol pass through a membrane to be part of a first permeate and other components of the alcoholic beverage do not pass through the membrane and are part of a first retentate. The first retentate may then be subjected to a membrane process by which at least some water and alcohol pass through a membrane to be part of a second permeate and other components of the first retentate do not pass through the membrane and are part of a second retentate. This process may be repeated, e.g., the second retentate may be subjected to a membrane process by which at least some water and alcohol pass through a membrane to be part of a third permeate and other components of the second retentate do not pass through the membrane and are part of a third retentate. The membrane processes may be the same or different, and may involve the use of a same or different membrane configuration, e.g., the membranes used may have a same or different pore size, material construction, etc. The permeate resulting from the membrane process may combine with a draw solution, if used, and if materials are recovered from the permeate, the combined permeate and draw solution (or other solution) may be subjected to the recovery process. In some embodiments, each membrane process may reduce an alcohol concentration of the alcoholic beverage or retentate by about 50%. Thus, after being subjected to three membrane separation steps, a starting alcoholic beverage may be reduced in alcohol to about 12% of the starting alcohol content. Additional membrane processes may reduce the alcohol concentration to about 4% or less.

The alcohol removed from the alcoholic beverage as a permeate may be recovered and used in some way, if desired. For example, the permeate may be distilled to separate alcohol in the permeate from other components of the permeate to produce a distilled alcohol solution. Again, the permeate may be mixed with a draw solution or other solution used in the membrane process, and the combined permeate/draw solution may be distilled. In some cases, the distilled alcohol solution formed by the distillation process has an alcohol concentration of at least 70%, e.g., 90% to 95% or more, up to the limiting azeotrope concentration of ethanol in water. The distilling process may be conducted in different ways, e.g., the distilling process may include a rectification action and a stripping action, may include aroma recovery, and/or may be conducted under a vacuum.

Concentrate and/or alcohol solution formed as part of the process may be used in a variety of different ways, e.g., the concentrate and distilled alcohol solution may be packaged in a beverage cartridge arranged for use by a beverage machine to produce a beverage. Prior to packaging or other use, the concentrate may be processed in different ways, e.g., may be filtered, may have ingredients added, may be pasteurized or sterilized, etc. Thus, a consumer may be able to simply place a cartridge in a beverage machine and have the machine create an alcoholic beverage that has the same, or very nearly the same, characteristics of the alcoholic beverage as purchased in finished form, because some aspects of the inventions in this application enable the removal of essentially only water during the concentrate preparation and also avoid many of the deleterious flavor-degradation effects of thermal concentration processes, such as evaporation. In some cases, the beverage concentrate and distilled alcohol solution may be packaged in separate chambers of the cartridge, e.g., to avoid turbidity or precipitate problems that may be caused by a relatively high alcohol concentration in the concentrate. In some embodiments, distilled alcohol solution may be added to the concentrate, e.g., to help inhibit the growth of microorganisms in the concentrate. For example, the beverage concentrate may have an alcohol concentration of less than 1%, and distilled alcohol solution may be added to the beverage concentrate to have an alcohol concentrate of 1% to 20%. Thus, the deleterious effects of thermal pasteurization or sterilization can be avoided.

In some embodiments, aroma compounds may be included in the original alcoholic beverage, and the aroma compounds may be removed from the beverage concentrate, e.g., because the compounds are soluble in alcohol and alcohol is removed from the alcoholic beverage in the concentration process. In some cases, aroma materials may be removed from the permeate formed in the membrane process, and the aroma materials may be added back to the beverage concentrate. For example, hop oils or other volatile compounds may be removed from the permeate and added back to the concentrate.

In other embodiments, the distilled alcohol solution may be used to extract aroma compounds or other components from a material that may be added to the concentrate or kept in the alcohol solution. For example, the distilled alcohol solution may be used to extract components from hops, such as hop oils and aromatics, and the extracted components may be kept in the alcohol solution, or extracted from the solution and added to the concentrate. This may enable another way to alter the flavor or aroma of a beverage made using the concentrate and/or alcohol solution. In some cases, the complex aromatic character of hops aroma can be preserved by maintaining the hops aroma compounds in the distilled alcohol solution; in this embodiment, hydrolytic degradation of the aroma components are reduced because the components are kept in a substantially alcohol and pH neutral solution instead of being in an acidic aqueous solution, which can induce or accelerate hydrolysis reactions such as the hydrolysis of aromatic esters so important to fermented beverage flavor and aroma. In some cases, a flavor component may be added to the distilled alcohol solution or beverage concentrate.

In another aspect of the invention, a method for forming a concentrate from an alcoholic beverage includes providing an alcoholic beverage including a solids concentration of 20% or less, and alcohol concentration of 30% or less, and water. The alcoholic beverage may be subjected to a diafiltration membrane process by which at least some water and alcohol pass through a membrane to be part of a permeate and other components of the alcoholic beverage do not pass through the membrane and are part of a retentate. Waters in the retentate may be frozen to form ice, and ice may be removed from the retentate to reduce water content and form a beverage concentrate having a solids concentration of at least 30% and an alcohol concentration of 20% or less.

Aspects of the invention also relate to a system for forming a beverage concentrate by performing a membrane process on an alcoholic beverage and/or resulting retentate, along with freeze concentration of the retentate to further reduce water content. Such a system may include an osmosis or other membrane and associated components (such as pumps to drive fluid flow, sensors, a draw solution tank and associated components, etc.) and a freeze concentration system which may include a chiller tank, wash column and other associated components.

These and other aspects of the invention will be apparent from the following description and claims.

BRIEF DESCRIPTION OF THE DRAWINGS

Aspects of the inventions are described with reference to the following drawings in which like numerals reference like elements, and wherein.

DETAILED DESCRIPTION

It should be understood that aspects of the inventions are described herein with reference to the figures, which show illustrative embodiments. The illustrative embodiments described herein are not necessarily intended to show all embodiments in accordance with the invention, but rather are used to describe a few illustrative embodiments. Thus, aspects of the invention are not intended to be construed narrowly in view of the illustrative embodiments. In addition, it should be understood that aspects of the inventions may be used alone or in any suitable combination with other aspects of the inventions.

Figure 1:
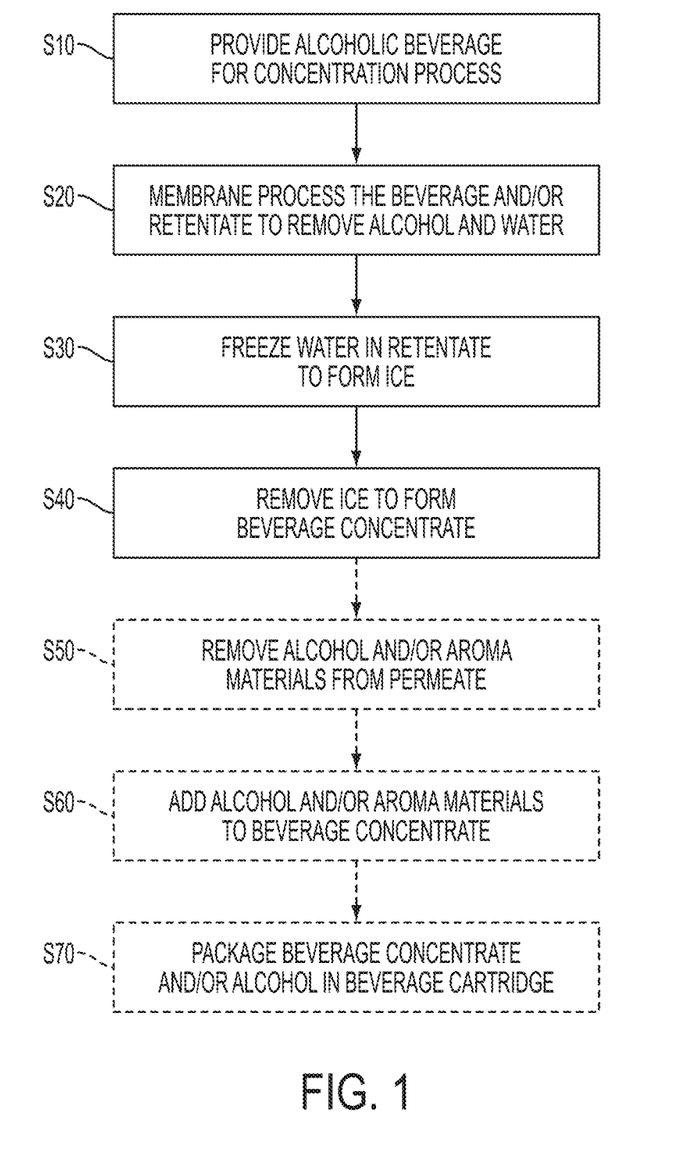
FIG. 1 shows steps of an illustrative method for forming a concentrate from an alcoholic beverage.

FIG. 1 shows steps in an illustrative process for forming a beverage concentrate from an alcoholic beverage. The beverage concentrate may be used for a variety of different purposes, including use with a beverage dispenser to make a beverage that is similar or nearly identical to the alcoholic beverage provided to the concentration process, with essentially only the water removed and little to no thermal or degradative damage of the beverage taste and aroma. In step S10, an alcoholic beverage is provided for the concentration process. The alcoholic beverage may take different forms, such as a beer or wine, and may be made in different ways. For example, a beer or wine may be made by fermentation process or may be synthesized in an artificial way by combining desired compounds together. Thus, the alcoholic beverage may includes any desired additives, adjuncts, etc., or may be made without any such additives. Along with water, the alcoholic beverage may include solids, alcohol and aroma components. The alcoholic beverage may have a solids concentration of 20% or less, e.g., 10% or less as is commonly found in beer. "Solids" in this context includes sugars (e.g., dextrines, maltose, etc.), proteins, and other relatively large molecules. The alcoholic beverage may have an alcohol concentration of 30% or less, e.g., 8% or less as is commonly found in beer or 15% or less as is often found in wine.

In step S20, the alcoholic beverage may be subjected to a membrane process to remove alcohol and water from the alcoholic beverage. The membrane process may be performed in a variety of different ways, e.g., as a batch process or continuous flow process, and may employ different techniques, such as reverse or forward osmosis, ultrafiltration, etc. Also, the membrane process may expose the alcoholic beverage (or a retentate) to one or more different types of membranes (e.g., having different pore sizes, material constructions, hydrophobic or hydrophillic characteristics, etc.) and/or one or more membrane separation steps. For example, an alcoholic beverage may be treated using an osmotic membrane to remove water and alcohol into a permeate and retain the solids and at least some alcohol and water in a retentate. The retentate may be treated using the same, or a different, osmotic membrane to again remove water and alcohol from the retentate. Such membrane treatment may be repeated multiple times, using the same or different membrane and/or other techniques. As another example, an alcoholic beverage may be first treated using a forward osmosis process to remove water and alcohol and to form a first retentate. The first retentate may then be treated using a reverse osmosis or other membrane process to remove water and alcohol from the first retentate to form a second retentate. Thus, the membrane process may involve the use of different membrane treatments that may be carried out in different ways.

In step S30, water in the retentate (i.e., a product formed as a result of the membrane process) is frozen to form ice. The water may be frozen in a variety of different ways, such as suitably chilling the walls of a reservoir in which the retentate is held, flowing the retentate over suitably chilled plates, etc. In step S40, ice formed in step S30 is removed from the retentate to form a beverage concentrate. The ice may be removed from the retentate in different ways, such as by a wash column used in some freeze concentration processes, forming ice on the walls of a reservoir and then removing the unfrozen liquid from the reservoir so as to leave the ice behind on the reservoir walls, by filtering ice crystals from the retentate, etc.

The resulting beverage concentrate may have a relatively high solids content, such as 30% or more, e.g., 50%, and an alcohol content of 20% or less, e.g., 5% to 1% or less. Thus, the ratio of the solids concentration of the beverage concentrate to the solids concentration in the original alcoholic beverage may be at least 3 to 1, or at least 5 to 1, or at least 10 to 1, or at least 15 to 1, or more. Moreover, the alcohol concentration of the beverage concentrate may be relatively low, e.g., 5% or less, so as to maintain a turbidity of the concentrate at an acceptably low level. That is, the inventors have found that relatively high alcohol concentration levels in an alcoholic beverage or beverage concentrate, e.g., of 30-40% or more, may increase turbity to an unacceptably high degree. High turbidity in a concentrate may cause an apparent cloudiness in a beverage that is formed using the concentrate, which is undesirable in many beverages such as American-style pilsner beers. By maintaining a low alcohol concentration in the beverage concentrate, unacceptably high turbidity levels can be avoided in both the concentrate and a beverage made from the concentrate. In some cases, relatively low alcohol concentrations may be provided to help inhibit the growth of organisms or other spoilage of the concentrate, e.g., alcohol levels of 3-5% in the concentrate may be sufficient to inhibit such problems. Also, the concentrate's flavor quality may be retained because no thermal stress is put on the concentrate as would be experienced with pasteurization or sterilization. However, in other cases, the alcohol concentration in the concentrate may be very low, e.g., below 1%, such as when the concentrate is used to make a low alcohol beer.

By removing substantially all of the alcohol in the alcoholic beverage prior to freeze concentration, the aspects of the inventions of this application avoid the problem of increasing freezing point depression as effected by increasing alcohol concentration, as well as the possible effect of slowing the freeze concentration process down due to repression of the crystallization process by alcohol, i.e. the "anti-freeze" effect.

In some cases the beverage concentrate may have a significantly smaller volume than a corresponding volume of alcoholic beverage used to make the concentrate. For example, in some cases a ratio of a volume of alcoholic beverage used to form a volume of beverage concentrate may be at least 3 to 1, at least 5 to 1, or more. Thus, a relatively small amount of concentrate may be used to make a significantly larger volume of beverage, e.g., 50 ml of concentrate may be used form a 350 ml beverage. This may provide for a convenient way to form beverages, e.g., because a container size used to hold the concentrate may be significantly smaller than a volume of beverage to be created using the concentrate. Also, in cases where the concentrate includes at least some alcohol to inhibit microbial growth, e.g., 1-5% alcohol, the resulting beverage may still have very low alcohol concentrations, such as less than 1%, because of the relatively large volume of water mixed with the concentrate to form the beverage.

As can be seen in FIG. 1, the illustrative method for forming a beverage concentrate may include one or more optional steps, e.g., steps S50 through S70. For example, in step S50, alcohol and/or aroma materials may be removed from permeate produced during the membrane process. That is, in some cases, it may be desireable to recover at least some of the alcohol and/or aroma materials removed from the alcoholic beverage when forming the concentrate so that these components can be used in some way. In some embodiments, at least some of the alcohol and/or aroma components may be reintroduced into the beverage concentrate, e.g., in step S60. For example, some volatile and/or alcohol-soluble aroma components may be removed along with alcohol during the membrane processing of the alcoholic beverage so as to end up in the permeate. These aroma components may enhance a drinker's enjoyment of a beverage produced using the concentrate, and thus may be recovered so they can be added to the concentrate. Similarly, it may be desireable to add at least some of the recovered alcohol to the concentrate, e.g., to help inhibit spoilage of the concentrate, without subjecting the concentrate to the damaging thermal effects of pasteurization or sterilization. Alternately, the recovered alcohol may be kept separate from the beverage concentrate until the time of beverage formation, e.g., to help reduce potential turbidity problems, and mixed with the concentrate and water to form the beverage.

The removal or separation of alcohol and/or aroma components from the permeate may be performed in different ways. In one illustrative embodiment, alcohol and/or aroma components are removed from the permeate using a distillation process, e.g., a process that employs both rectification and stripping processes. However, other techniques may be used such as freeze concentration, osmotic or other membrane separation, etc.

Another optional step, in step S70, involves packaging the beverage concentrate and/or alcohol in a cartridge that may be used by a beverage dispenser to form a beverage using the concentrate and/or alcohol. For example, the beverage concentrate and alcohol may be packaged in separate compartments of a cartridge that are sealed closed, e.g., to protect the concentrate and alcohol from light, air and/or moisture. The cartridge may be arranged for use with a beverage forming machine or other dispenser such that the concentrate and alcohol are mixed with a liquid, such as chilled, carbonated water, for forming a beverage.

Figure 2:
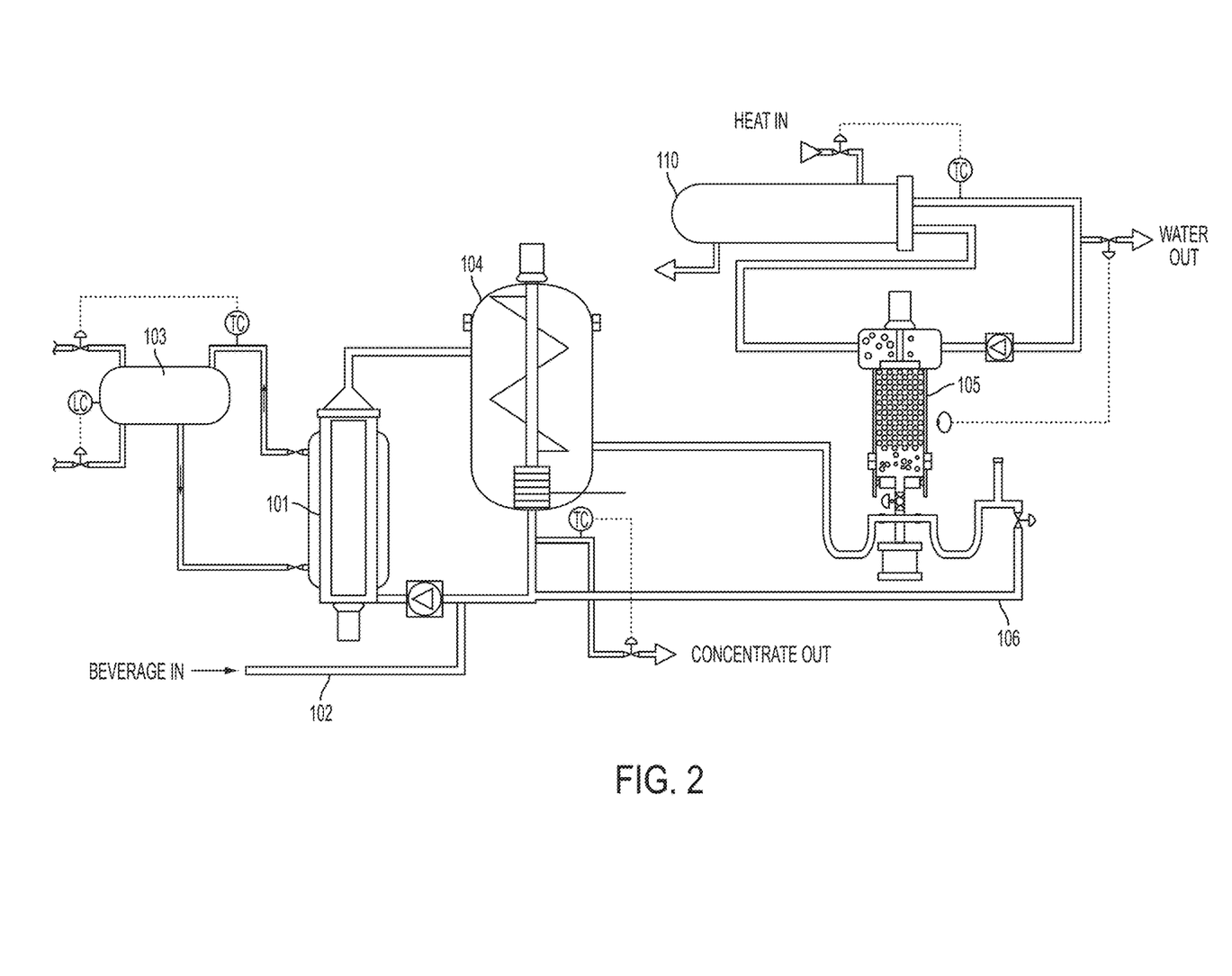
FIG. 2 shows a schematic diagram of a system used to form a concentrate from an alcoholic beverage in an illustrative embodiment.

As noted above, different techniques and systems may be used to perform a membrane process on the alcoholic beverage to form a concentrate. Such processes may include reverse or forward osmosis (which involve the use of a membrane having a molecular weight rejection of about 50 to 500 daltons), diafiltration (which involves the use of a reverse osmosis membrane), ultrafiltration (which involves the use of a membrane having a pore size of about 0.01 to 0.1 microns), or others. Such membranes may be made of any suitable materials, such as polyamide, which is commonly used in reverse osmosis membranes and generally has ethanol rejection efficiencies lower than 30%. To drive the movement of alcohol, water and other components through the membrane, pressure may be applied to the feed stock (as in reverse osmosis), osmotic pressure may be exploited (as in forward osmosis), and/or other techniques. FIG. 2 shows an illustrative system that may be used to form a concentrate. In this embodiment, the alcoholic beverage is provided via a feed supply 102, which may include a conduit, pump, filter (e.g., to remove large particulates) and/or other components, to a membrane 101. While the membrane 101 may be arranged in a variety of different ways, in this embodiment, the membrane 101 is configured as a cylindrical member to which the alcoholic beverage is supplied. On a side of the membrane 101 opposite the alcoholic beverage, is a draw solution which may be configured to establish a desired osmotic pressure across the membrane 101. The draw solution may be provided via a draw solution supply 103, which may include a holding tank, lines leading from the holding tank to the membrane 101, a pump to circulate the draw solution relative to the membrane 101, inlet and outlet lines (e.g., by which draw solution and permeate may be removed from the system and replacement draw solution may be provided to the system), sensors, and/or other components. As is understood in the art, the draw solution may include desired components, such as salts, sugars, etc., used to establish a desired osmotic pressure, if used. In this embodiment, alcoholic beverage provided to the membrane 101 has alcohol and water removed by having the alcohol and water pass through the membrane to form a permeate that combines with the draw solution.

Components of the alcoholic beverage that do not pass through the membrane 101, including alcohol, water, solids and other components, are part of a retentate that, in this embodiment, exits to a chiller tank 104. The chiller tank 104 has one or more chilled components, such as the outer wall of the tank 104, such that water in the retentate is frozen to form ice. The ice formed may include crystals that are mixed with other portions of the retentate that are not frozen and/or ice that forms on the chilled components of the tank, such as the tank wall. Ice that is attached to components of the tank 104 may be removed from the tank 104, such as by a scraper or other device that shaves or otherwise separates portions of the ice so the ice mixes with the unfrozen retentate.

The retentate including ice crystals or other ice particles flow from the chiller tank 104 to a wash column 105, filter or other device arranged to separate the ice from other parts of the retentate. In this embodiment, ice in the wash column 105 moves to the top of the column 105 and flows out of the column 105 to a heat exchanger 110 which melts the ice so that liquid water can be removed from the system. Remaining parts of the retentate exit the wash column 105 via a return path 106. In some embodiments, a single pass through the system will produce a retentate with suitable properties to be a finished beverage concentrate, which may be removed from the system. However, in other embodiments, the retentate in the return path 106 may again enter the membrane 101 to be subjected to another membrane process, and possibly freeze concentration to remove more alcohol and water from the retentate. Thus, retentate may circulate through the system one or more times to form a beverage concentrate having desired properties, e.g., a desired solids concentration, alcohol concentration, etc.

Of course, the system in FIG. 2 is only one illustrative embodiment and other configurations may be used to form a beverage concentrate. For example, two or more membranes 101 may be arranged in series and/or parallel to treat an alcoholic beverage feedstock and subsequent retentate. These membranes 101 may have the same or different configuration, e.g., may employ the same or different pore size, the same or different draw solution, the same or different membrane material or construction, the same or different processes (e.g., reverse osmosis, forward osmosis, diafiltration, etc.), and so on. Also, alternate methods for forming ice and/or separating the ice from other portions of the retentate may be used as well.

Figure 3:
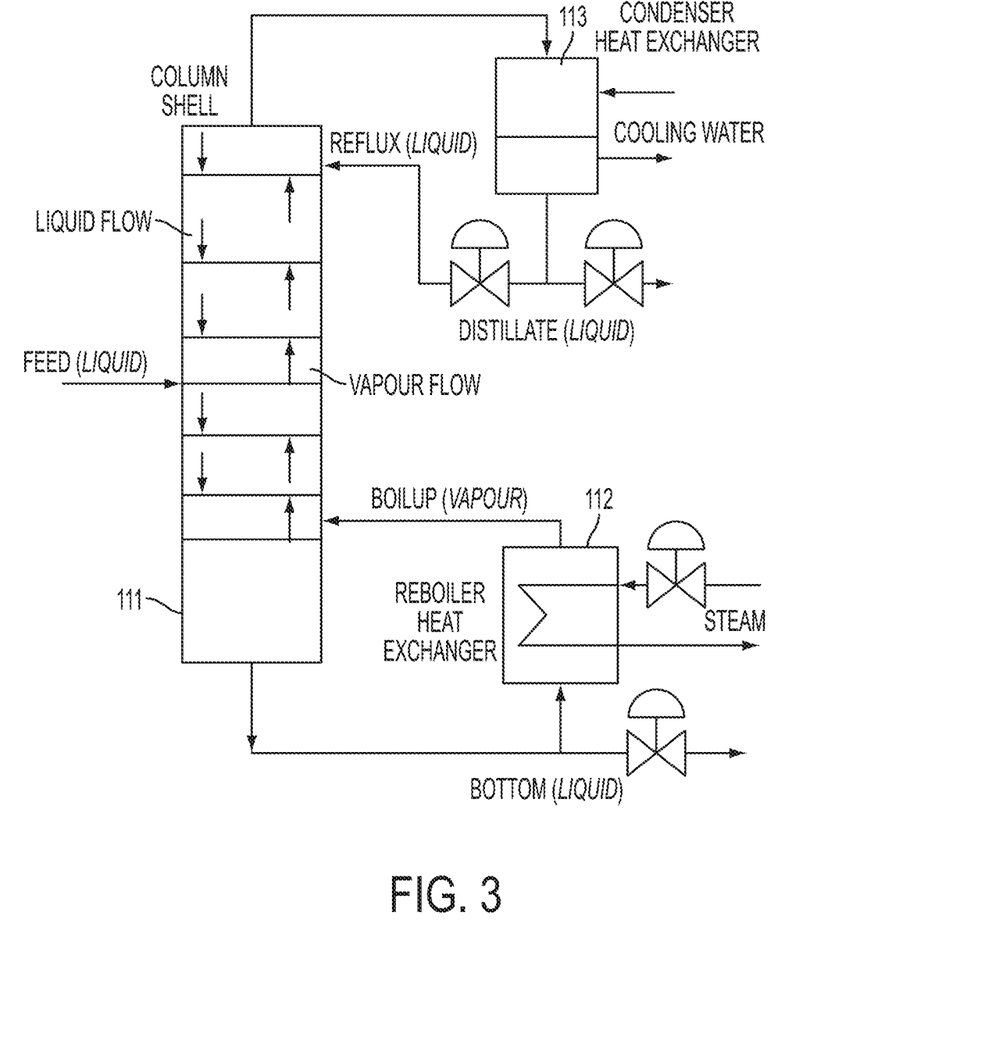
FIG. 3 shows a schematic diagram of a system used to separate alcohol and/or aroma components from a permeate in an illustrative embodiment.

As noted above, the permeate produced via the membrane process may be treated to separate alcohol and/or aroma components from other portions of the permeate and any draw solution. That is, as a result of the membrane process, alcohol, water and/or aroma components may pass through the membrane 101 and mix with a draw solution, if used. The permeate produced from one or more membrane treatments may be combined and processed to separate alcohol and/or aroma components, or may be processed separately. Different processes may be used to separate the alcohol and/or aroma components from other parts of the permeate (and any draw solution), such as distillation. FIG. 3 shows one illustrative embodiment of a distillation system for separating alcohol and/or aroma components from a permeate. In this embodiment, the permeate is provided at a feed input to a distillation column 111 which includes both a rectification section (above the feed input) and a stripping section (below the feed input). Of course, rectification and stripping need not both be used, and instead only rectification or stripping may be employed. Vapor exiting the column 111 may pass to a condenser 113, which removes heat from the vapor to condense the vapor to a liquid. The condensed liquid, which includes alcohol and/or aroma compounds as well as water and possibly other components, may be removed from the system as a distillate. Alternately, or in addition, all or a portion of the condensed liquid may be reintroduced into the column 111 as a reflux liquid. Liquid at a bottom of the column 111 may be heated via reboiler 112, which may transfer heat from steam or other source to the liquid via a heat exchanger. Of course, the liquid may be heated in other ways. The separated alcohol and/or aroma components may be combined with a beverage concentrate, or may be maintained separate from the beverage concentrate until a later time. For example, the alcohol and/or aroma components may be packaged in a beverage cartridge for use by a beverage machine to form a beverage by mixing the beverage concentrate, alcohol, aroma components and water. In some embodiments, the alcohol and beverage concentrate may be stored separately in the cartridge, e.g., to reduce any turbidity problems that may be caused by a high alcohol concentration in the beverage concentrate.

Figure 4:
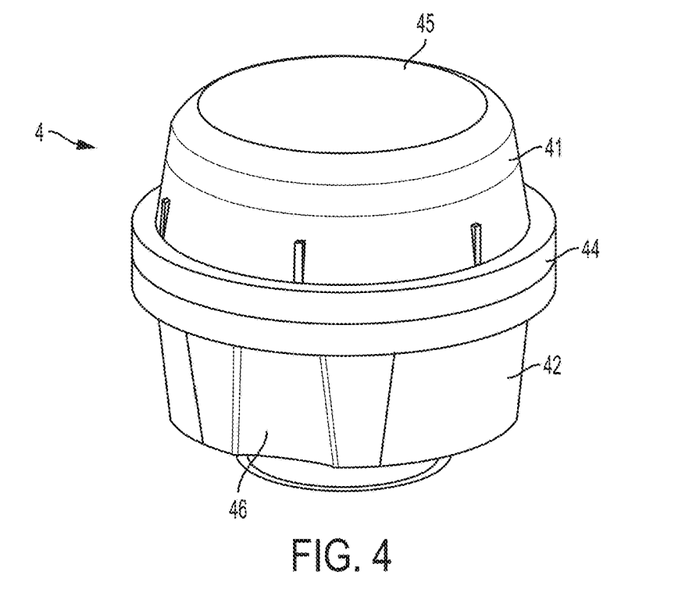
FIG. 4 shows a perspective view of a cartridge in an illustrative embodiment.
Figure 5:
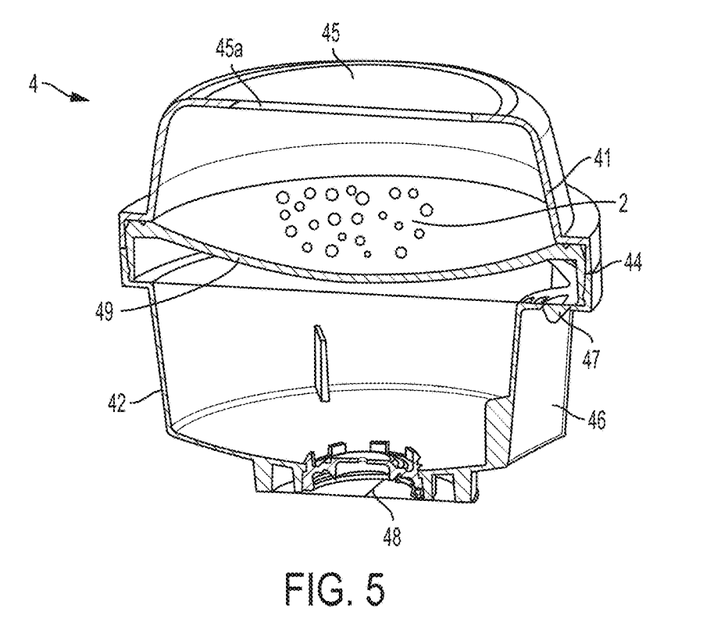
FIG. 5 shows a cross sectional view of the FIG. 4 cartridge.

FIGS. 4 and 5 show an illustrative embodiment of a cartridge that may be used to package a beverage concentrate and/or alcohol produced via a method in accordance with aspects of the invention. In this embodiment, the cartridge 4 includes a container that defines an upper compartment or chamber 41, a lower compartment or chamber 42, and a rim or band 44 between a top and bottom of the cartridge 4. While this embodiment includes two chambers 41, 42, a cartridge may have one chamber or three or more chambers if desired. Also, in this embodiment the first chamber 41 contains a gas source that can release a gas to be used by a beverage machine to carbonate a beverage. However, such a gas source is not required. The top of the cartridge 4 includes a lid 45 that covers an opening of the container. The lid 45 is pierceable to form one or more openings so as to access the gas source 2 in the upper compartment 41. (Although in this embodiment, the lid 45 is a separate element, such as a sheet of foil/polymer laminate attached to the container body, the lid may be molded or otherwise formed integrally with the body.) Also, a filter 45a may be positioned below the lid 45, e.g., spaced apart from the lid 45 but parallel to the lid 45 although other arrangements are possible. This filter 45a may help prevent gas source material from exiting the upper compartment 41 during gas production. The upper compartment 41 is also defined in part by a wall 49 that has a concave up curve, but such a shape is not necessary, e.g., the wall 49 may be flat or concave down. The cartridge 4 also includes a pierceable inlet 47 located at an underside of the rim 44 and at an indexing groove 46 of the cartridge 4. As is discussed in more detail below, the inlet 47 may be pierced to allow access to the lower compartment 42, e.g., so pressurized gas or liquid can be introduced into the lower compartment 42 to move a beverage medium (such as a beverage concentrate) out of an outlet 48 of the lower compartment 42. In this embodiment, the outlet 48 includes a pierceable membrane that can be pierced and opened to allow the beverage medium to exit, although other arrangements are possible, e.g., a self-closing septum valve or burstable seal may be provided at the outlet 48 that opens with increased pressure in the lower compartment 48. Cartridges are not limited to the arrangement shown in FIGS. 4 and 5, however, and a beverage making system 1 may be arranged to operate with cartridges 4 that include only a gas source (e.g., only a rim 44 and upper compartment 41) to make a carbonated water, or only a beverage medium (e.g., only a rim 44 and lower compartment 42 like that shown in FIG. 18) to make a still, flavored beverage. Moreover, the lower compartment 42 may be divided into two or more chambers, e.g., where a beverage concentrate and alcohol are held separately until the cartridge is used to make a beverage. Each chamber may have its own outlet, and the concentrate and alcohol may be forced from the respective chamber to flow out of the outlets in response to gas pressure being introduced into the chambers via the gas inlet 47.

The cartridge 4 may be made of any suitable materials, and is not necessarily limited to the constructions shown herein. For example, the cartridge may be made of, or otherwise include, materials that provide a barrier to moisture and/or gases, such as oxygen, water vapor, etc. In one embodiment, the cartridge may be made of a polymer laminate, e.g., formed from a sheet including a layer of polystyrene, polypropylene and/or a layer of EVOH and/or other barrier material, such as a metallic foil. Moreover, the cartridge materials and/or construction may vary according to the materials contained in the cartridge. For example, a portion of the cartridge 4 containing a gas source material may require a robust moisture barrier, whereas a beverage medium (e.g., beverage concentrate) portion may not require such a high moisture resistance. Thus, the cartridges may be made of different materials and/or in different ways. In addition, the cartridge interior may be differently constructed according to a desired function. For example, a beverage medium cartridge portion may include baffles or other structures that cause the liquid/beverage medium to follow a tortuous path so as to encourage mixing. The gas source cartridge portion may be arranged to hold the gas source in a particular location or other arrangement in the interior space, e.g., to help control wetting of the gas source with activating liquid. Thus, as used herein, a "cartridge" may take any suitable form, such as a pod (e.g., opposed layers of filter paper encapsulating a material), capsule, sachet, package, or any other arrangement. The cartridge may have a defined shape, or may have no defined shape (as is the case with some sachets or other packages made entirely of flexible material). The cartridge may be impervious to air and/or liquid, or may allow water and/or air to pass into the cartridge. The cartridge may also containing an oxygen-scavenging system to protect the beverage concentrate from oxidative damage.

A cartridge may also be arranged to provide a visual or other detectable indication regarding the cartridge's fitness for use in forming a beverage. For example, the cartridge may include a pop-up indicator, color indicator or other feature to show that the gas source has been at least partially activated. Upon viewing this indication, a user may determine that the cartridge is not fit for use in a beverage making machine. In another embodiment, an RFID tag may be associated with a sensor that detects gas source activation (e.g., via pressure increase), beverage medium spoilage (e.g., via temperature increase), or other characteristic of the cartridge, which may be transmitted to a reader of a beverage making machine. The machine may display the condition to a user and/or prevent activation of the machine to use the cartridge to form a beverage.

Figure 6:
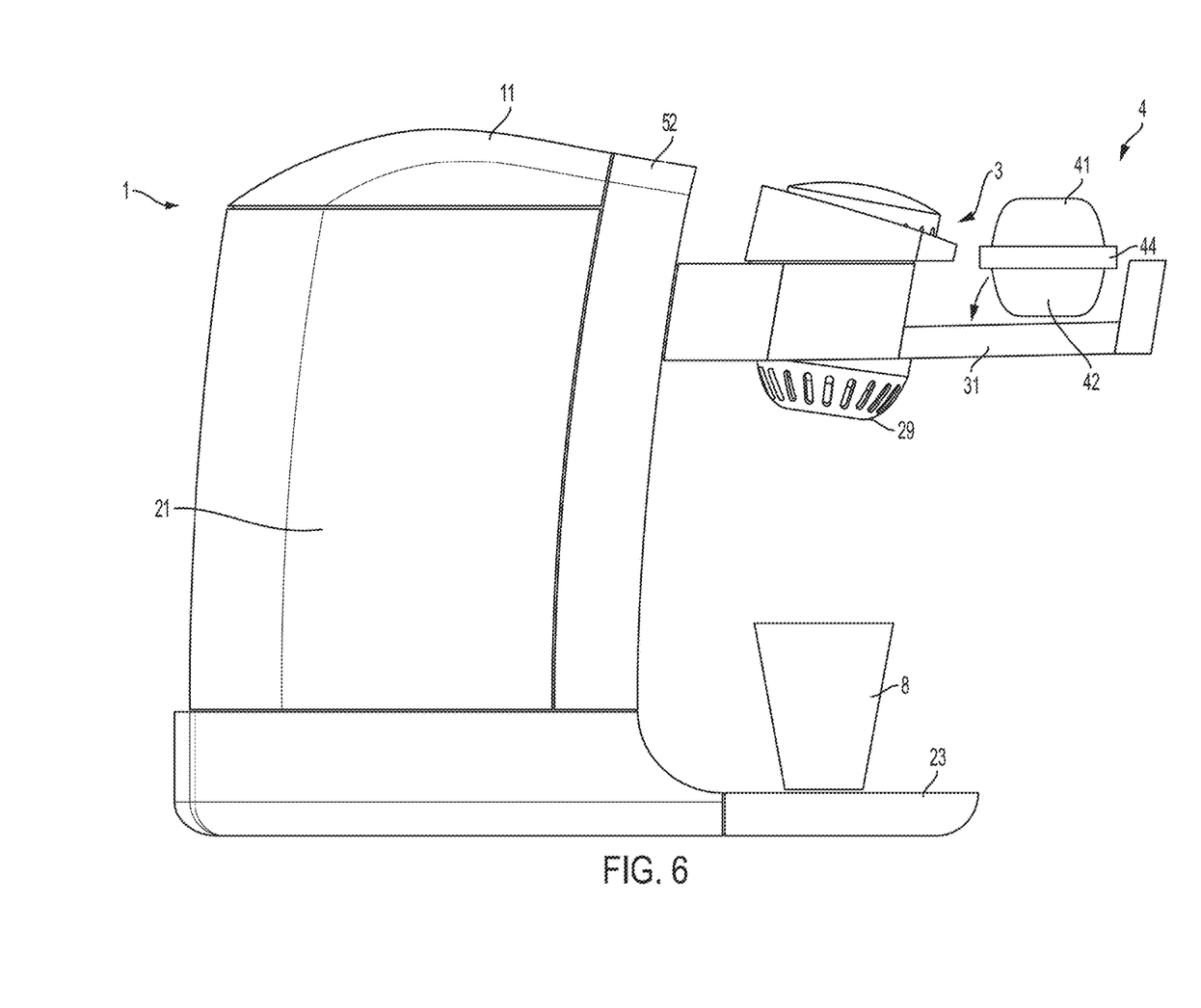
FIG. 6 shows a side view of a beverage forming machine in an illustrative embodiment.

FIG. 6 shows an illustrative embodiment of a beverage making machine 1 that can employ a cartridge in accordance with one or more aspects of the invention. In this embodiment, components of the beverage making machine 1 are located in or on a housing 21 which includes a drip tray 23 to support a user's cup or other container 8 and a reservoir 11 to provide water (a precursor liquid) to make a beverage. In this case, the reservoir 11 is optionally removable from the housing 21 and contains beverage precursor liquid that is used to form a beverage dispensed at a dispensing station 29 into the user's container 8. The reservoir 11 includes a removable lid that can be removed to provide precursor liquid into the reservoir 11, but such a lid is not required. Moreover, the reservoir 11 need not be removable and/or may be replaced by a plumbed connection to a mains water source. The beverage precursor liquid can be any suitable liquid, including water (e.g., flavored or otherwise treated water, such as sweetened, filtered, deionized, softened, carbonated, etc.), or any other suitable liquid used to form a beverage, such as milk, juice, coffee, tea, etc. (whether heated or cooled relative to room temperature or not). The reservoir 11 is part of a beverage precursor supply which provides the precursor liquid for conditioning of some kind, e.g., carbonation, filtering, chilling, mixing with a beverage medium, etc., and subsequent dispensing as a beverage.

A cartridge 4 containing a gas source and/or a beverage medium may be associated with a cartridge holder 3 of the machine 1. The gas source may emit carbon dioxide or other gas which is used by the machine 1 to carbonate the precursor liquid, and a beverage medium, such as a beverage concentrate and/or alcohol, may be mixed with precursor liquid. In this embodiment, the cartridge 4 may be associated with the cartridge holder 3 by pulling a sliding drawer 31 forwardly to expose a cartridge receiver or receiving area of the drawer 31. The cartridge 4, which in this case includes an upper compartment or chamber 41 containing a gas source 2 and a lower compartment or chamber 42 containing a beverage medium, may be placed in the cartridge receiving area of the drawer 31 and the drawer 31 closed by sliding to the left in FIG. 6. Thereafter, a user may interact with an interface 52, such as a touch screen, button or other device by which the user can cause the machine 1 to make a beverage. In response, the cartridge 4 may be clamped at a rim or band 44 located between the upper and lower compartments 41, 42 by the cartridge holder 3 and the compartments 41, 42 accessed to form the beverage. The upper and lower compartments 41, 42 of the cartridge 4 may be held in spaces having different pressures (e.g., the upper compartment 41 may be held in a more highly pressurized space to receive carbonating gas than the lower compartment 42) and/or the holder's ability to pierce an inlet of the lower compartment 42 at an underside of the rim or band 44 to access the beverage medium (e.g., by injecting pressurized air or other gas into the lower compartment 42, thereby forcing the beverage medium to exit the cartridge and be dispensed at the dispense station 29). Since the cartridge 4 may be replaceable, a user may exchange the cartridge 4 to make different beverages, such as a carbonated, alcoholic beverage.

Figure 7:
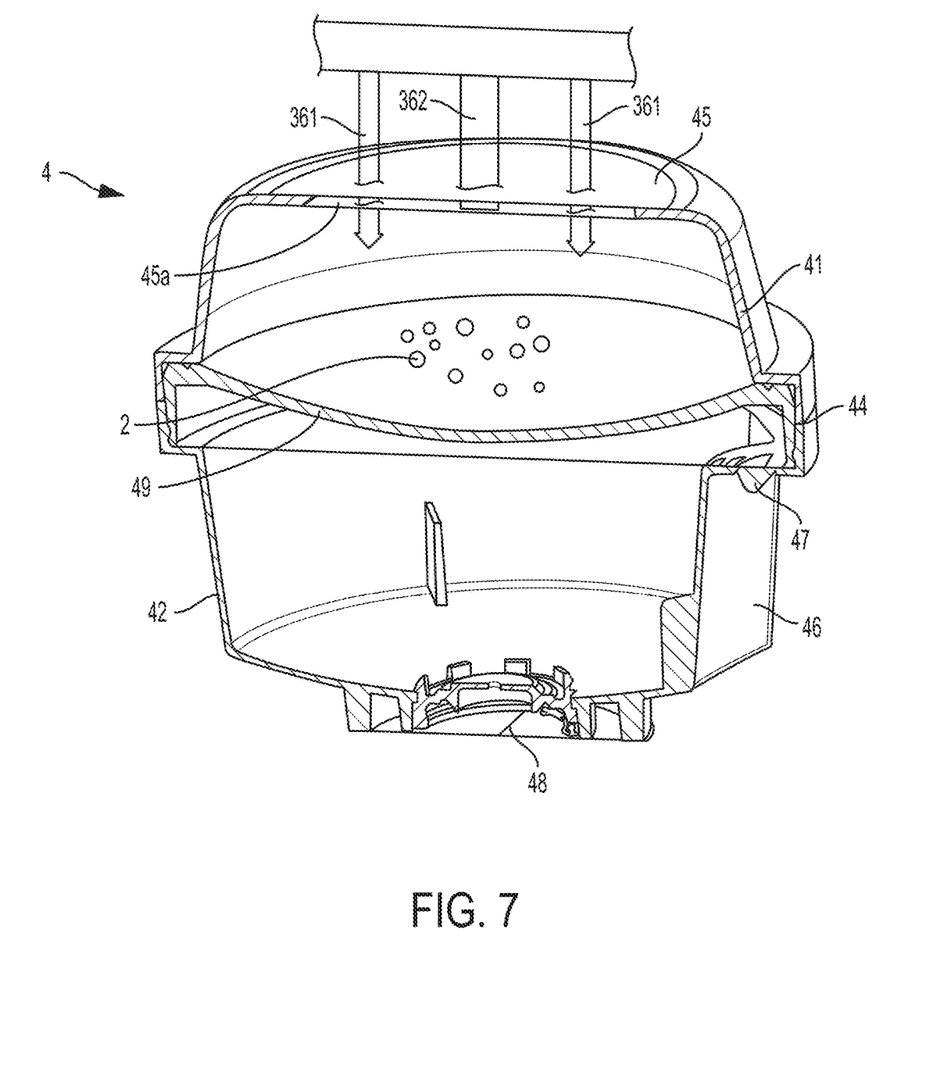
FIG. 7 shows the cross sectional view of the FIG. 4 cartridge with piercing elements engaged at the lid of the cartridge.

FIG. 7 shows an illustrative embodiment for accessing the upper compartment 41 of the cartridge 4 when the cartridge 4 is held in the cartridge holder 3 of the beverage making machine 1. In this arrangement, one or more piercing elements 361 may pierce the lid 45 to introduce activating fluid into the upper compartment 41, and a piercing element 362 may pierce the lid 45 to allow gas emitted by the gas source to exit the cartridge 4. Though not necessary, the piercing elements 361 are arranged to penetrate through the lid 45 and the filter 45a so that activating fluid can be introduced below the filter 45a. However, the piercing element 362 is arranged to pierce only the lid 45, but not the filter 45a. In this way, gas emitted in the upper compartment 41 by the gas source material 2 must pass through the filter 45a before exiting to the carbonating gas supply. This may help prevent gas source material, such as zeolite particles, from exiting the cartridge 4 and passing to the precursor liquid or portions of the machine 1. A variety of arrangements are possible for the filter 45a, such as a piece of filter paper mentioned above, a hydrophobic non-woven material that permits gas to pass, but resists liquid passage, or other element that permits gas to exit the cartridge 4, but resists movement of gas source material and/or liquid. In addition or alternately to the filter 45a, a conduit that receives the carbonating gas may include a filter element, such as a filter plug in the conduit, to help further resist movement of gas source materials from the cartridge 4. The piercing elements, may include a hollow needle, spike, blade, knife or other arrangement, to form a suitable opening in the cartridge 4. In this embodiment, the piercing elements 361 include tubular elements with an activating fluid discharge opening at a distal end such that activating fluid can be released from the piercing elements 361 below the filter 45a. In contrast, the piercing element 362 is relatively dull so as to penetrate the lid 45, but not the filter 45a. Alternately, the cartridge 4 may have defined openings, e.g., one or more ports, that include a septum or other valve-type element that permits flow into and/or out of the cartridge 4.

Figure 8:
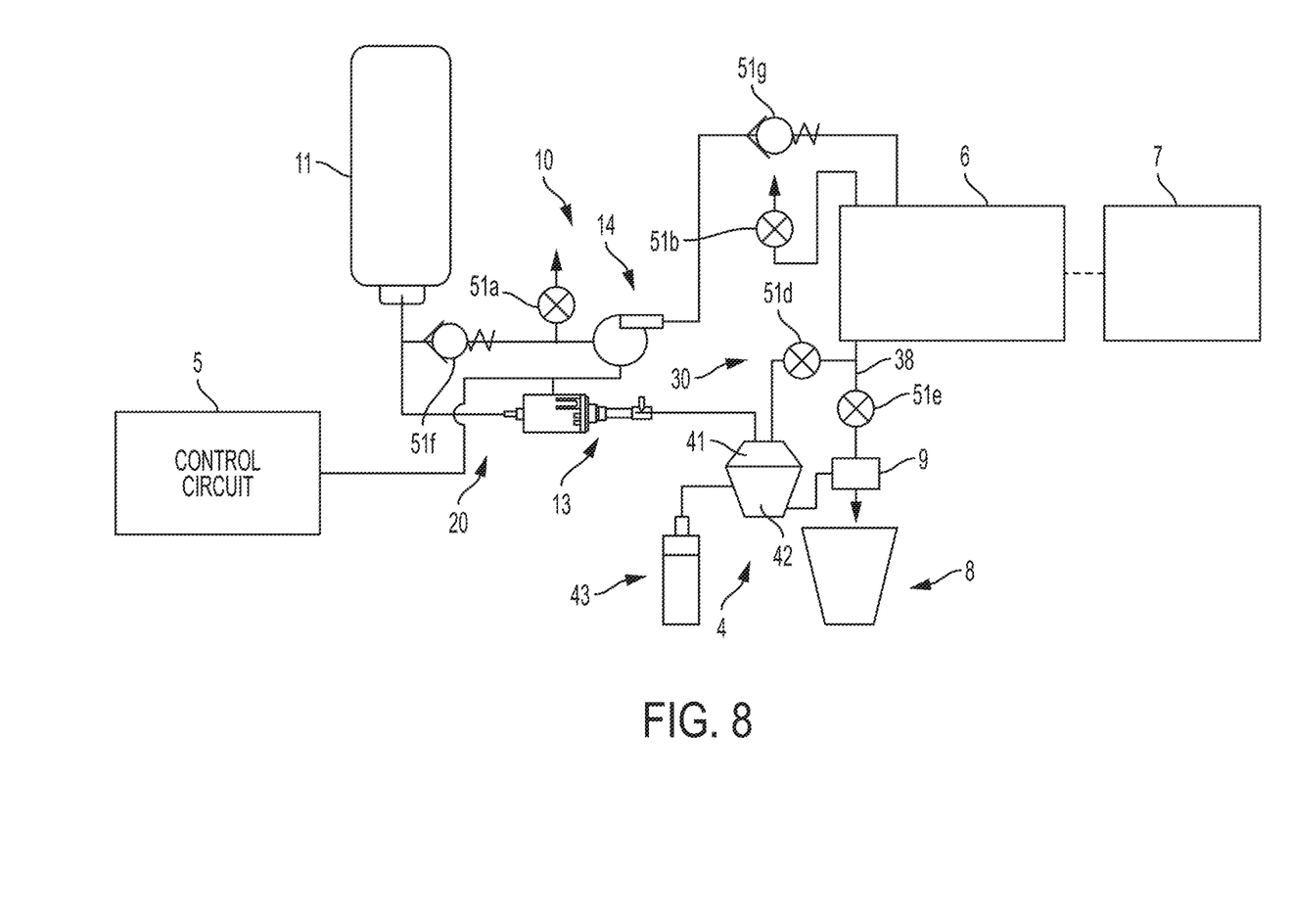
FIG. 8 shows a schematic diagram of components of a beverage forming system in an illustrative embodiment.

While a beverage making machine 1 may employ different liquid and gas flow path arrangements, FIG. 8 shows one such arrangement that may be used in the beverage making machine 1. In this embodiment, precursor liquid provided by a precursor liquid supply 10 originates in the reservoir 11, which may be removable from the machine 1, e.g., to allow for easier filling, or may be fixed in place. Although in this embodiment a user initially provides the beverage precursor liquid in the reservoir 11, the precursor supply 10 may include other components to provide liquid to the reservoir 11, such as a plumbed water line, controllable valve, and liquid level sensor to automatically fill the reservoir 11 to a desired level, a second water reservoir or other tank that is fluidly connected to the reservoir 11, and other arrangements. Liquid is delivered by a pump 14 to the carbonation tank 6 via a check valve 51f upstream of the pump 14 and a check valve 51g downstream of the pump 14. The check valves 51f, 51g may help prevent backflow from the carbonation tank 6, e.g., when the tank 6 is relatively highly pressurized during the carbonating process. In this instance, the pump 14 is a diaphragm pump, but other pump types are possible. The carbonation tank 6 may be suitably filled with liquid using any suitable control method, such as by sensing a level in the tank 6 using a conductive probe, pressure sensor, optical sensor or other sensor. A tank vent valve 51b may be opened during filling to allow the pressure in the tank 6 to vent, or may remain closed during filling, e.g., to allow a pressure build up in the tank 6. An activating fluid supply 20 which includes a pump 13 is arranged to provide activating fluid to the upper compartment of the cartridge 4, i.e., to cause the gas source material 2 to release gas to the carbonation tank 6. Gas emitted by the cartridge 4 is routed to the tank 6 via a valve 51d. A control circuit 5 may control operation of the valves 51, e.g., the valves 51 may include electromechanical or other actuators, as well as include sensors to detect various characteristics, such as temperature in the tank 6, pressure in the tank 6, a flow rate of gas or liquid in any of the system flow lines, etc. Alternately, the system 1 may include a compressed gas tank that provides carbonating gas under pressure, rather than using a gas source in a cartridge.

To form a beverage, a user may associate a cartridge 4 with the machine 1, e.g., by loading the cartridge 4 into a cartridge holder 3 in a way like that discussed with respect to FIG. 6. Of course, a cartridge may be associated with the machine 1 in other ways, such as by screwing a portion of the cartridge into engagement with the machine 1, etc. With the cartridge 4 associated with the machine 1, the control circuit 5 may then activate the machine 1 to deliver liquid to the cartridge 4, e.g., to cause carbon dioxide to be generated. (Though this embodiment uses a cartridge with a gas source activated by a fluid, other arrangements are possible.) The control circuit 5 may start operation of the machine 1 in an automated way, e.g., based on detecting the presence of a cartridge 4 in the holder 3, detecting liquid in the carbonation tank 6 and closure of the holder 3, and/or other characteristics of the machine 1. Alternately, the control circuit 5 may start system operation in response to a user interacting with an interface 52, e.g., pressing a start button or otherwise providing input (e.g., by voice activation) to start beverage preparation.

To initiate carbonation after the tank is provided with a suitable amount of precursor liquid, the vent valve 51*b* may be closed and the pump 13 controlled to pump liquid into the upper compartment 41 of a cartridge 4 that contains a gas source 2. That is, the machine 1 may include a carbon dioxide activating fluid supply 20 that provides a fluid, e.g., in a controlled volume, at a controlled rate or otherwise to control a gas production rate, to a cartridge 4 so as to activate a carbon dioxide source in the upper compartment 41 to release carbon dioxide gas. In this embodiment, the carbon dioxide source includes a charged adsorbent or molecular sieve, e.g., a zeolite material that has adsorbed some amount of carbon dioxide gas that is released in the presence of water, whether in vapor or liquid form. Other arrangements or additions are possible for the carbon dioxide activating fluid supply 20, such as a dedicated liquid supply for the cartridge 4 that is separate from the precursor liquid supply, a pressure-reducing element in the conduit, a flow-restrictor in the conduit, a flow meter to indicate an amount and/or flow rate of fluid into the cartridge 4, a syringe, piston pump or other positive displacement device that can meter desired amounts of liquid (whether water, citric acid or other material) to the cartridge 4, and others. In another embodiment, the activating fluid supply 20 may include a gravity fed liquid supply that has a controllable delivery rate, e.g., like the drip-type liquid supply systems used with intravenous lines for providing liquids to hospital patients, or may spray atomized water or other liquid to provide a water vapor or other gas phase activating fluid to the cartridge 4.

A carbon dioxide gas supply 30 may be arranged to provide carbon dioxide gas from the cartridge 4 to an area where the gas is used to carbonate the liquid, in this case, the carbonation tank 6. The gas supply 30 may be arranged in any suitable way, and in this illustrative embodiment includes a conduit that is fluidly connected between the cartridge 4 and a carbonated liquid outlet of the carbonation tank 6. A gas control valve 51*d* is controllable by the control circuit 5 to open and close the flow path through the gas supply conduit. (Note that in some embodiments, the valve 51*d* may be a check valve that is not controllable by the control circuit 5.) The carbonation gas is delivered via a carbonating gas supply line that is fluidly coupled to the dispense line of the carbonation tank so as to deliver carbon dioxide gas to the outlet of the carbonation tank to carbonate the precursor liquid. This arrangement may provide advantages, such as introducing the carbonating gas at a relatively low point in the tank, which may help increase contact of the gas with the precursor liquid, thereby enhancing dissolution of the gas. In addition, the flow of carbonating gas through at least a portion of the dispense line 38 may help purge the dispense line 38 of liquid, helping to re-carbonate the liquid, if necessary. The gas conduit may be connected to the dispense line 38 close to the dispense valve 51e so as to purge as much liquid from the dispense line 38 as possible.

The gas supply 30 may include other components than a conduit and valve, such as pressure regulators, safety valves, additional control valves, a compressor or pump (e.g., to increase a pressure of the gas), an accumulator (e.g., to help maintain a relatively constant gas pressure and/or store gas), and so on. (The use of an accumulator or similar gas storage device may obviate the need to control the rate of gas output by a cartridge. Instead, the gas source may be permitted to emit gas in an uncontrolled manner, with the emitted gas being stored in an accumulator for later delivery and use in producing a sparkling beverage. Gas released from the accumulator could be released in a controlled manner, e.g., at a controlled pressure and/or flow rate.) Also, carbonation of the precursor liquid may occur via one or more mechanisms or processes, and thus is not limited to one particular process. For example, while delivery of carbon dioxide gas to the outlet of the carbonation tank 6 may function to help dissolve carbon dioxide in the liquid, other system components may further aid in the carbonation process. In some embodiments, a sparger may be used to introduce gas into the carbonation tank, precursor liquid may be circulated in the tank, and/or other techniques may be used to alter a rate at which carbonating gas is dissolved.

Before, during and/or after carbonation of the liquid in the carbonation tank 6, a cooling system 7 may chill the liquid. The cooling system 7 may operate in any suitable way, e.g., may include ice, refrigeration coils or other cooling elements in thermal contact with the carbonation tank 6. In addition, the carbonation tank 6 may include a mixer or other agitator to move the liquid in the tank 6 to enhance gas dissolution and/or cooling. Operation in forming a beverage may continue for a preset amount of time, or based on other conditions, such as a detected level of carbonation, a drop in gas production by the cartridge 4, or other parameters. During operation, the amount of liquid provided to the cartridge 4 may be controlled to control gas output by the cartridge 4. Control of the liquid provided to the cartridge 4 may be made based on a timing sequence (e.g., the pump may be operated for a period of time, followed by stoppage for a period, and so on), based on detected pressure (e.g., liquid supply may be stopped when the pressure in the tank 6 exceeds a threshold, and resume when the pressure falls below the threshold or another value), based on a volume of activating liquid delivered to the holder 3 (e.g., a specific volume of liquid may be delivered to the cartridge 4 in one or more discrete volumes), or other arrangements.

With the precursor liquid in the carbonation tank 6 ready for dispensing, the vent valve 51*b* may be opened to reduce the pressure in the carbonation tank 6 to an ambient pressure. As is known in the art, depressurizing the carbonation tank prior to dispensing may aid in maintaining a desired carbonation level of the liquid during dispensing. With the tank 6 vented, the vent valve 51*b* may be closed and a pump vent valve 51*a* may be opened. The pump 14 may then be operated to draw air or other gas into the inlet side of the pump 14 and pump the gas into the carbonation. While the pump 14 delivers air to the carbonation tank, the dispense valve 51e is opened and the gas valve 51d is closed during liquid dispensing. The dispensed liquid may enter a mixing chamber 9 at which the carbonated liquid and beverage medium provided from the lower compartment 42 of the cartridge 4 are combined. The beverage medium may be moved out of the cartridge 4 and to the mixing chamber 9 by introducing pressurized gas into the lower compartment 42, e.g., by way of an air pump 43. For example, both alcohol and beverage concentrate may be forced from the cartridge and into the mixing chamber 9 for mixing with carbonated water.

The beverage medium may include an alcoholic beverage concentrate as discussed above, alcohol and/or any other suitable beverage making materials (beverage medium), such as concentrated syrups, ground coffee or liquid coffee extract, tea leaves, dry herbal tea, powdered beverage concentrate, dried fruit extract or powder, natural and/or artificial flavors or colors, acids, aromas, viscosity modifiers, clouding agents, antioxidants, powdered or liquid concentrated bouillon or other soup, powdered or liquid medicinal materials (such as powdered vitamins, minerals, bioactive ingredients, drugs or other pharmaceuticals, nutraceuticals, etc.), powdered or liquid milk or other creamers, sweeteners, thickeners, and so on. (As used herein, "mixing" of a liquid with a beverage medium includes a variety of mechanisms, such as the dissolving of substances in the beverage medium in the liquid, the extraction of substances from the beverage medium, and/or the liquid otherwise receiving some material from the beverage medium.)

The control circuit 5 may use one or more sensors to control a carbonation level of the precursor liquid, a temperature to which the liquid is chilled (if at all), a time at which and during which beverage medium is delivered to the mixing chamber 9, a rate at which carbonating gas is produced and delivered to the tank 6, and/or other aspects of the beverage making process. For example, a temperature sensor may detect the temperature of the precursor liquid in the carbonation tank 6. This information may be used to control system operation, e.g., warmer precursor liquid temperatures may cause the control circuit 5 to increase an amount of time allowed for carbon dioxide gas to be dissolved in the precursor liquid. In other arrangements, the temperature of the precursor liquid may be used to determine whether the machine 1 will be operated to carbonate the liquid or not. For example, in some arrangements, the user may be required to add suitably cold liquid (and/or ice) to the reservoir 11 before the machine 1 will operate. (As discussed above, relatively warm precursor liquid temperatures may cause the liquid to be insufficiently carbonated in some conditions.) In another embodiment, a pressure sensor may be used to detect a pressure in the carbonation tank 6. This information may be used to determine whether the carbonation tank 6 is properly or improperly filled, if a pressure leak is present, if carbonation is complete and/or to determine whether sufficient carbon dioxide gas is being produced by the cartridge 4. For example, low detected pressure may indicate that more carbon dioxide needs to be generated, and thus cause the control circuit 5 to allow more liquid to be delivered by the activating fluid supply 20 to the cartridge 4. Likewise, high pressures may cause the flow of liquid from the activating fluid supply 20 to be slowed or stopped. Thus, the control circuit 5 can control the gas pressure in the carbonation tank 6 and/or other areas of the machine 1 by controlling an amount of liquid delivered to the cartridge 4. Alternately, low pressure may indicate that there is a leak in the system and cause the system to indicate an error is present. In some embodiments, measured pressure may indicate that carbonation is complete. For example, pressure in the tank 6 may initially be detected to be at a high level, e.g,. around 70-80 psi, and later be detected to be at a low level, e.g., around 40 psi due to gas being dissolved in the liquid. The low pressure detection may indicate that carbonation is complete. A sensor could also detect the presence of a cartridge 4 in the cartridge holder 3, e.g., via RFID tag, optical recognition, physical sensing, etc. If no cartridge 4 is detected, or if the control circuit 5 detects that the cartridge 4 is spent, the control circuit 5 may prompt the user to insert a new or different cartridge 4. For example, in some embodiments, a single cartridge 4 may be used to carbonate multiple volumes of precursor liquid. The control circuit 5 may keep track of the number of times that the cartridge 4 has been used, and once a limit has been reached (e.g., 10 drinks), prompt the user to replace the cartridge. Other parameters may be detected by a sensor, such as a carbonation level of the precursor liquid (which may be used to control the carbonation process), the presence of a suitable vessel to receive a beverage discharged from the machine 1 (e.g., to prevent beverage from being spilled), the presence of water or other precursor liquid in the carbonation tank 6 or elsewhere in the precursor supply 10, a flow rate of liquid in the pump 13 or associated conduit, the presence of a headspace in the carbonation tank 6 (e.g., if no headspace is desired, a valve may be activated to discharge the headspace gas, or if only carbon dioxide is desired to be in the headspace, a snifting valve may be activated to discharge air in the headspace and replace the air with carbon dioxide), and so on.

The control circuit 5 may also be arranged to allow a user to define a level of carbonation (i.e., amount of dissolved gas in the beverage, whether carbon dioxide or other). For example, the control circuit 5 may include a touch screen display or other user interface 52 that allows the user to define a desired carbonation level, such as by allowing the user to select a carbonation volume level of 1, 2, 3, 4 or 5, or selecting one of a low, medium or high carbonation level. Cartridges used by the machine 1 may include sufficient gas source material to make the highest level of carbonation selectable, but the control circuit 5 may control the system to dissolve an amount of gas in the beverage that is consistent with the selected level. For example, while all cartridges may be arranged for use in creating a "high" carbonation beverage, the control circuit 5 may operate the machine 1 to use less of the available gas (or cause the gas source to emit less gas than possible) in carbonating the beverage. Carbonation levels may be controlled based on a detected carbonation level by a sensor, a detected pressure in the carbonation tank 6 or elsewhere, an amount of gas output by the cartridge 4, or other features. (A carbonation "volume" refers to the number of volume measures of carbon dioxide gas that is dissolved in a given volume measure of liquid. For example, a 1 liter amount of "2 volume" carbonated water includes a 1 liter volume of water that has 2 liters of carbon dioxide gas dissolved in it. Similarly, a 1 liter amount of "4 volume" carbonated water includes a 1 liter volume of water that has 4 liters of carbon dioxide dissolved in it. The gas volume measure is the gas volume that could be released from the carbonated liquid at atmospheric or ambient pressure and room temperature.)

In another embodiment, the cartridge 4 may include indicia readably by the controller, e.g., an RFID tag, barcode, alphanumeric string, etc., that indicates a carbonation level to be used for the beverage. After determining the carbonation level from the cartridge 4, the control circuit 5 may control the machine 1 accordingly. Thus, a user need not select the carbonation level by interacting with the machine 1, but rather a carbonation level may be automatically adjusted based on the beverage selected. In yet another embodiment, a user may be able to select a gas source cartridge 4 that matches a carbonation level the user desires. (Different carbonation levels may be provided in the different cartridges by having different amounts of gas source in the cartridge 4.) For example, cartridges providing low, medium and high carbonation levels may be provided for selection by a user, and the user may pick the cartridge that matches the desired carbonation level, and provide the selected cartridge to the machine 1. Thus, a gas source cartridge labeled "low" may be chosen and used with the system to create a low level carbonated beverage.

It should be understood that modifications to the illustrative embodiment above are possible. For example, the beverage medium could be driven from the cartridge 4 in other ways, such as by carbon dioxide gas pressure created by the cartridge 4, by gravity, by suction created by an adductor pump, venturi or other arrangement, etc., and the beverage medium may be dispensed directly into a user's cup where the precursor liquid is also introduced. Rinsing of the mixing chamber 9 may or may not be necessary, e.g., to help prevent cross contamination between beverages. In some arrangements, the entire volume of beverage medium may be discharged into the mixing chamber, causing initial amounts of flavored precursor liquid exiting the mixing chamber 9 to have a high beverage medium concentration. However, as the beverage medium is swept from the mixing chamber by the precursor liquid, the precursor liquid itself may effectively rinse the mixing chamber. In arrangements where the beverage medium is a dry material, such as a powder, some precursor liquid may be introduced into the cartridge to pre-wet the medium or otherwise improve an ability to mix the medium with precursor liquid. The wetted medium may be mixed with additional precursor liquid in the cartridge, or the wetted medium may be expelled from the cartridge, e.g., by air pressure, a plunger, etc., to a mixing chamber or other location for additional mixing with precursor liquid. Liquid may be introduced into a mixing chamber using multiple streams, e.g., to enhance a mixing rate using low flow speeds so as to reduce loss of dissolved gas.

Also, the mixing chamber 9 may take other suitable forms, e.g., may cause the precursor liquid and beverage medium to move in a spiral, swirl or other fashion to enhance mixing, may have one or more motor driven blades, impellers or other elements to mix contents in the chamber 9, and so on. While the mixing chamber 9 may be separate from the cartridge 4, the mixing chamber 9 could be incorporated into a cartridge 4 if desired. The mixing chamber 9 may be cooled as well, e.g., by a refrigeration system, to help cool the beverage provided to the cup 8. In the case where the carbonated liquid is not flavored or where the liquid is mixed with the beverage medium before passing through the carbonation tank 6, the mixing chamber 9 may be eliminated or arranged to mix the precursor liquid and beverage medium upstream of the tank 6. Alternately, the precursor liquid supply 10 may be arranged to mix the precursor liquid with the beverage medium in the cartridge 4 prior to routing the liquid to the tank 6.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed:

1. A method for forming a concentrate from an alcoholic beverage, comprising:
   providing an alcoholic beverage including a solids concentration of 20% or less, and an alcohol concentration of 30% or less, and water;
   forming a retentate by removing alcohol from the alcoholic beverage using a membrane process by which at least some water and alcohol pass through a membrane to be part of a permeate and other components of the alcoholic beverage do not pass through the membrane and are part of the retentate;
   freezing water in the retentate to form ice;
   removing ice from the retentate to reduce water content; and
   forming a beverage concentrate from the retentate having a solids concentration of at least 30% and an alcohol concentration of 20% or less, the alcohol concentration of the beverage concentrate being less than the alcohol concentration of the alcoholic beverage.

2. The method of claim 1, wherein the beverage concentrate has a solids concentration of at least 40%.

3. The method of claim 1, wherein the beverage concentrate has an alcohol concentration of 2% or less.

4. The method of claim 1, wherein a ratio of a volume of alcoholic beverage used to form a volume of beverage concentrate to the volume of the beverage concentrate is at least 3 to 1.

5. The method of claim 1, wherein a ratio of a volume of alcoholic beverage used to form a volume of beverage concentrate to the volume of the beverage concentrate is at least 5 to 1.

6. The method of claim 1, wherein a ratio of the solids concentration in the alcoholic beverage to the solids concentration in the beverage concentrate is at least 5 to 1.

7. The method of claim 1, wherein a ratio of the solids concentration in the alcoholic beverage to the solids concentration in the beverage concentrate is at least 15 to 1.

8. The method of claim 1, wherein the step of forming a retentate includes subjecting the alcoholic beverage to a membrane process by which at least some water and alcohol pass through a membrane to be part of a first permeate and other components of the alcoholic beverage do not pass through the membrane and are part of a first retentate; and
   subjecting the first retentate to a membrane process by which at least some water and alcohol pass through a membrane to be part of a second permeate and other components of the first retentate do not pass through the membrane and are part of a second retentate.

9. The method of claim 8, further comprising:
   subjecting the second retentate to a membrane process by which at least some water and alcohol pass through a membrane to be part of a third permeate and other components of the second retentate do not pass through the membrane and are part of a third retentate.

10. The method of claim 1, wherein the step of forming a retentate includes subjecting the retentate to one or more additional membrane processes by which at least some water and alcohol pass through a membrane to be part of the permeate and other components of the alcoholic beverage do not pass through the membrane and are part of the retentate.

11. The method of claim 10, wherein each membrane process reduces an alcohol concentration of the alcoholic beverage or retentate by about 50%.

12. The method of claim 1, further comprising: distilling the permeate to separate alcohol in the permeate from other components of the permeate to produce a distilled alcohol solution.

13. The method of claim 12, wherein the distilled alcohol solution has an alcohol concentration of at least 70%.

14. The method of claim 13, further comprising: packaging the beverage concentrate and distilled alcohol solution in a beverage cartridge arranged for use by a beverage machine to produce a beverage.

15. The method of claim 14, wherein the beverage concentrate and distilled alcohol solution are packaged in separate chambers of the cartridge.

16. The method of claim 1, wherein the step of subjecting produces a retentate having an alcohol concentration of less than 4%.

17. The method of claim 12, wherein the beverage concentrate has an alcohol concentration of less than 1%, the method further comprising: adding distilled alcohol solution to the beverage concentrate to have an alcohol concentrate of 1% to 20%.

18. The method of claim 1, wherein the membrane process is a forward osmosis process or a reverse osmosis process.

19. The method of claim 1, further comprising: removing aroma materials from the permeate; and adding the aroma materials to the beverage concentrate.

20. The method of claim 1, wherein the step of forming a retentate includes: using a draw solution on a side of the membrane opposite the retentate with which the permeate combines.

21. The method of claim 20, wherein the draw solution includes a salt or sugar to provide a suitable osmotic pressure for alcohol and water to pass through the membrane.

22. The method of claim 12, comprising an additional step of adding enough of the distilled alcohol solution to said beverage concentrate to inhibit microbial growth within said concentrate.

23. The method of claim 12, comprising using said distilled alcohol solution to extract components from hops.

24. The method of claim 12, comprising adding a flavor component to said distilled alcohol solution or said beverage concentrate.

25. The method of claim 12, wherein said distilling step comprises a rectification action and a stripping action.

26. The method of claim 12, wherein said distilling step includes aroma recovery.

27. The method of claim 12, wherein said distilling step is conducted under a vacuum.

28. The method of claim 1, further comprising filtering said beverage concentrate.

29. The method of claim 1, wherein said alcoholic beverage is selected from the group consisting of beer, cider, mead, malt liquor, lager, and ale.

30. The method of claim 1, wherein said alcoholic beverage is the product of a high gravity brewing process.

31. The method of claim 1, wherein said beverage concentrate is used to make an alcohol-free beer comprising less than 1% alcohol.

32. The method of claim 1, wherein said freezing action causes a lagering action on a non-lagered alcoholic beverage.

33. A method for forming a concentrate from an alcoholic beverage, comprising:
providing an alcoholic beverage including a solids concentration of 20% or less, and alcohol concentration of 30% or less, and water;
forming a retentate by removing alcohol from the alcoholic beverage using a diafiltration membrane process by which at least some water and alcohol pass through a membrane to be part of a permeate and other components of the alcoholic beverage do not pass through the membrane and are part of the retentate;
freezing water in the retentate to form ice;
removing ice from the retentate to reduce water content; and
forming a beverage concentrate from the retentate having a solids concentration of at least 30% and an alcohol concentration of 20% or less, the alcohol concentration of the beverage concentrate being less than the alcohol concentration of the alcoholic beverage.

* * * * *